(12) United States Patent
Ogawa (10) Patent No.: US 9,748,877 B2
(45) Date of Patent: Aug. 29, 2017

(54) MOTOR DRIVE CIRCUIT AND METHOD

(71) Applicant: SEMICONDUCTOR COMPONENTS INDUSTRIES, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 75 days.

(21) Appl. No.: 14/693,005

(22) Filed: Apr. 22, 2015

(65) Prior Publication Data

US 2016/0315568 A1    Oct. 27, 2016

(51) Int. Cl.
| | |
|---|---|
| *H02K 29/08* | (2006.01) |
| *H02P 1/00* | (2006.01) |
| *H02P 6/20* | (2016.01) |
| *H02P 27/08* | (2006.01) |
| *F02B 37/007* | (2006.01) |

(52) U.S. Cl.
CPC .............. *H02P 6/20* (2013.01); *H02P 27/085* (2013.01); *F02B 37/007* (2013.01)

(58) Field of Classification Search
CPC .................. H02P 6/16; H02P 6/20; H02P 6/28

USPC ..................................................... 318/400.38
See application file for complete search history.

(56) References Cited

U.S. PATENT DOCUMENTS

| | | | | |
|---|---|---|---|---|
| 4,544,868 A | * | 10/1985 | Murty ..................... | H02P 6/085 318/400.11 |
| 5,623,379 A | * | 4/1997 | Nishimura ............. | G11B 19/20 318/400.17 |
| 6,359,406 B1 | * | 3/2002 | Chiu ...................... | F02B 37/007 318/400.38 |

* cited by examiner

*Primary Examiner* — Bentsu Ro
*Assistant Examiner* — Zemenay Truneh
(74) *Attorney, Agent, or Firm* — Rennie William Dover (57) ABSTRACT

In accordance with an embodiment, a method for driving a motor includes determining a position of a first pole of a rotor of the motor relative to a position of a Hall sensor. A drive signal is generated in response to the position of the first pole of the rotor of the motor, the drive signal having a duty in accordance with the duty control signal or a second duty control signal. In accordance with another embodiment, a drive circuit for a motor includes a state controller connected to a rotational state generation unit, a pulse width modulation detection circuit, and a duty control controller. An align duty set circuit is connected to the duty control controller.

19 Claims, 9 Drawing Sheets

| $V_{CC}(V)$ | $V_{ADS}(V)$ | ALIGN OUTPUT DUTY (%) |
|---|---|---|
| 20 | 3.00 | 5.0 |
| 16 | 2.90 | 25.0 |
| 14 | 2.10 | 35.0 |
| 12 | 1.80 | 45.0 |
| 10 | 1.50 | 55.0 |
| 8 | 1.20 | 65.0 |
| 6 | 0.90 | 75.0 |
| 4 | 0.60 | 85.0 |
| 3.3 | 0.50 | 88.5 |
| 0 | 0.00 | 100.00 |

FIG. 16

MOTOR DRIVE CIRCUIT AND METHOD

BACKGROUND

The present invention relates, in general, to motors and, more particularly, to three phase motors.

Multi-phase motors are used in a variety of applications including disc drives, digital video disc players, scanners, printers, plotters, actuators used in the automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensor-less motor drive circuit, i.e., a motor without sensors. U.S. Pat. No. 6,570,351 issued to Shinichi Miyazaki et al. on May 27, 2003, discloses a three-phase motor without sensors. A drawback with sensor-less motor drive configurations is that they may fail to start if the inductive voltage of the coil is small. In addition, a motor may fail to start if the duty is too low and the threshold duty varies from motor to motor.

Accordingly, it would be advantageous to have a multi-phase motor drive circuit and a method for driving the motor that is not overly complex and that can handle small inductive coil voltages. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

In accordance with embodiments of the present invention, the startup duty ratio may be set using a dedicated external input pin. In accordance with an embodiment, a method for driving a motor comprises determining a position of a first pole of a rotor of the motor relative to a position of a Hall sensor. A first duty control signal or a second duty control signal is received in response to the position of the first pole of the rotor of the motor. A drive signal is generated having a duty in accordance with the first duty control signal or the align duty set signal.

In accordance with another embodiment, a method for driving a motor, includes providing a motor having a rotor having a first pole of a first magnetic polarity and a second pole of a second magnetic polarity, a stator, a first coil coupled at a first position of the stator and associated with a first drive phase, a second coil coupled at a second position of the stator and associated with a second drive phase, and a third coil coupled at a third position of the stator and associated with a third drive phase of a drive signal. A Hall sensor is coupled to the stator and a drive circuit is coupled to the motor, wherein the drive circuit has an input pin dedicated for receiving an align duty set signal. The Hall sensor is configured to determine a position of the first pole of the rotor. An align duty set ratio is determined in response to the align duty set signal. The motor may be started using a signal having one of the duty ratio of the align duty set signal or a predetermined duty ratio.

In accordance with another embodiment, a drive circuit is connected to a motor that has a plurality of coils and a single Hall sensor having a first terminal and a second terminal. The drive circuit comprises a rotational state generation circuit, a state controller, a pulse width modulation detection circuit, and a duty control controller. An align duty set circuit has an output connected to the duty control controller and an input terminal that serves as a dedicated input pin of the drive circuit.

Figure 1:
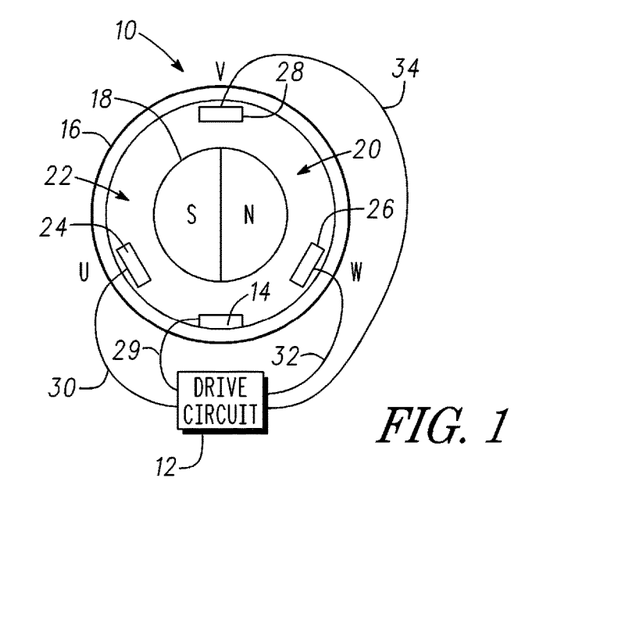
FIG. 1 is a diagrammatic representation of a motor that is driven by a drive circuit in accordance with an embodiment of the present invention.

FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first magnetization pole and a portion 22 magnetized with a second magnetization pole. By way of example, portion 20 is a north pole and portion 22 is a south pole. A U-phase winding 24 is coupled to or mounted on a portion of stator 16, a W-phase winding 26 is coupled to or mounted on another portion of stator 16, and a V-phase winding 28 is coupled to or mounted on yet another portion of stator 16. Drive circuit 12 is coupled to Hall sensor 14 via an electrical interconnect 29, to U-phase winding 24 via an electrical interconnect 30, to W-phase winding 26 via an electrical interconnect 32, and to V-phase winding 28 through an electrical interconnect 34. Electrical interconnects 30, 32, and 34 may be wires, electrically conductive traces, or the like.

Figure 2:
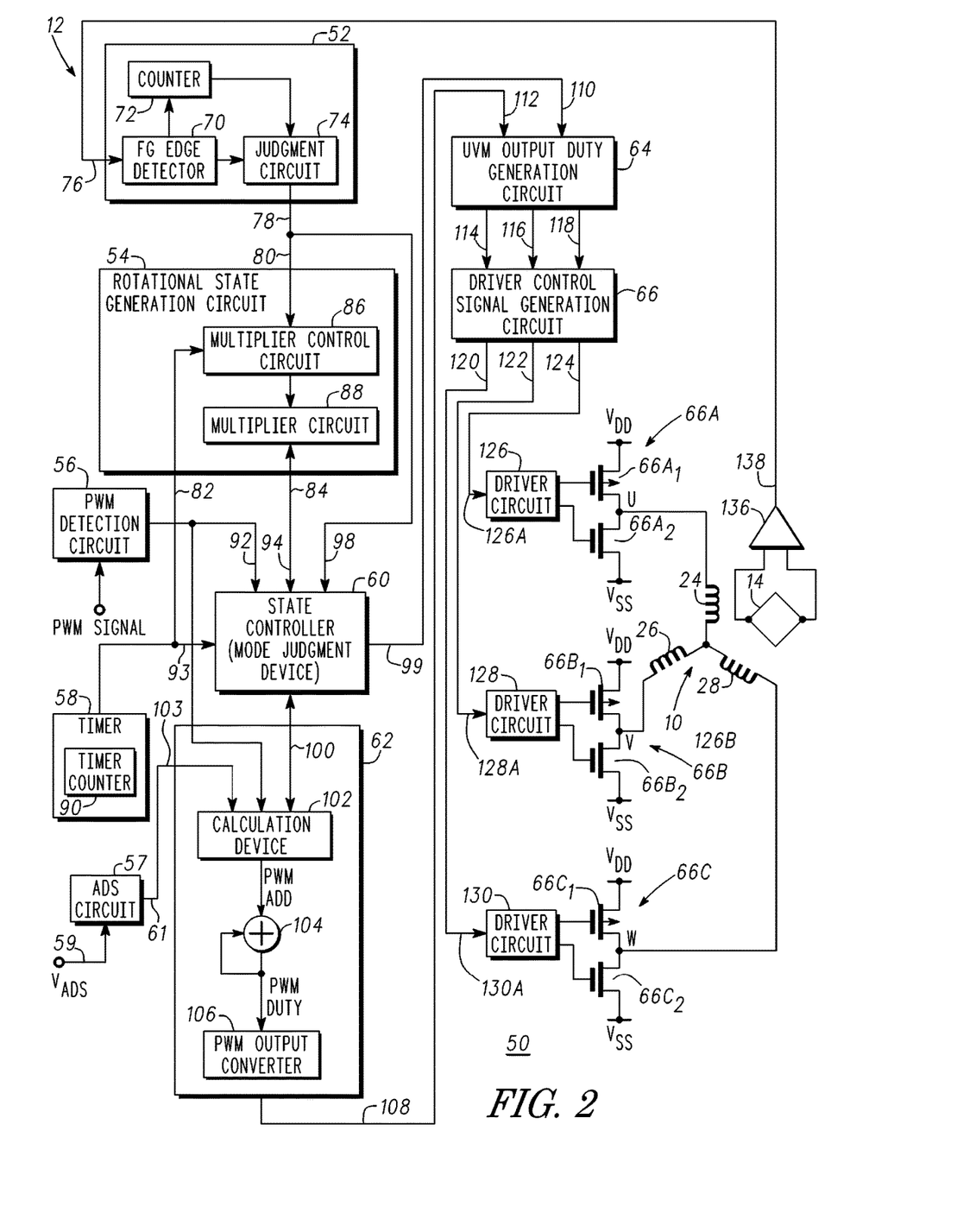
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, an align duty set (ADS) circuit 57, a timer 58, a state controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54. Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input 92 of state controller 60 and to an input 103 of duty control controller 62 and is configured to determine the speed of rotor 18. It should be noted that if the duty range is small the speed of the rotor is smaller than if the duty range is large. Align duty set circuit 57 has an input 59 and an output 61, wherein input 59 serves as or, alternatively, is connected to a dedicated external ADS input pin and output 61 is connected to an input 101 of duty control controller 62. ADS circuit 57 is configured to determine an alignment duty setting signal. Timer 58 has an output connected to input 82 of rotational state generation circuit 54 and to an input of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 65, which signal generation circuit 65 has a plurality of outputs 120, 122, and 124 connected to corresponding inputs of output drive stage 66. In accordance with an embodiment, drive stage 66 includes driver devices 126, 128, and 130 having inputs that serve as inputs 126A, 128A, and 130A of output drive stage 66, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, a current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, a current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, a current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

Figure 3:
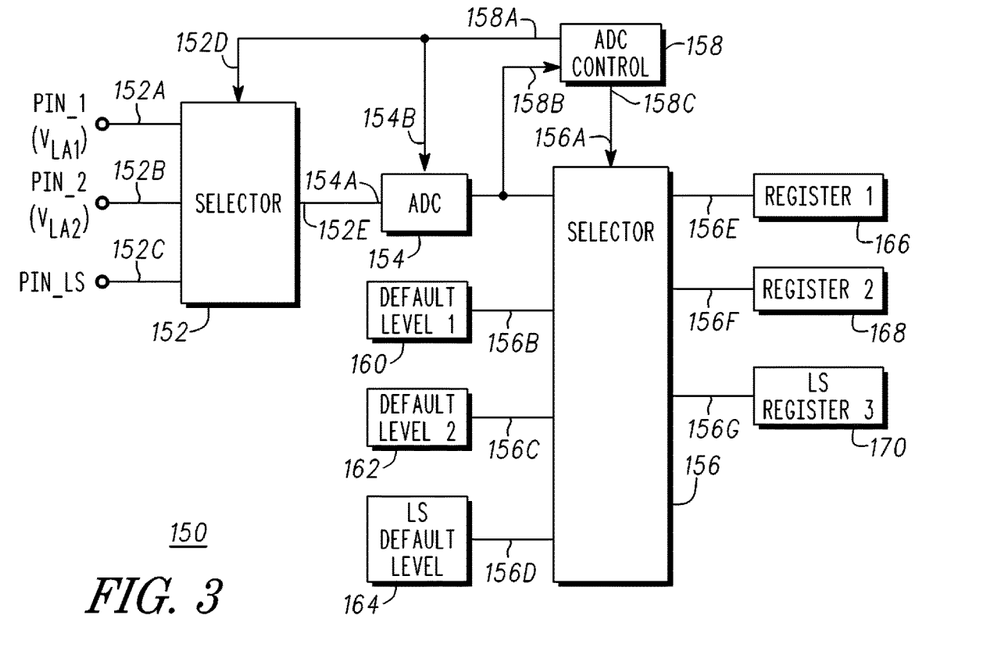
FIG. 3 is a circuit schematic of a portion of the drive circuit of FIG. 1 in accordance with another embodiment of the present invention.

FIG. 3 is a block diagram of a duty determination circuit 150 which may be a circuit block within PWM detection circuit 56 in accordance with an embodiment of the present invention. What is shown in FIG. 3 is a selector 152, an analog-to-digital converter ("ADC") 154, a selector 156, an ADC control circuit 158, and a plurality of registers 160, 162, and 164 coupled to corresponding inputs of selector 158, and a plurality of registers 166, 168, and 170 coupled to corresponding outputs of selector 158. More particularly, selector 152 has inputs 152A, 152B, and 152C that are coupled for receiving PWM signals from three-phase motor 10, an input 152D connected to an output 158A of ADC control circuit 158. ADC 154 has an input 154A connected to an output 152E and an input 154B connected to output 158A of ADC control circuit 158. Input 152A is coupled to or, alternatively serves as, a first advanced angle pin, Pin_1, input 152B is coupled to or, alternatively serves as, a second advanced angle pin, Pin_2, and input 152C is coupled to or, alternatively serves as, a lowest speed PWM setting pin, Pin_LS. Selector 156 has an input 156A connected to an output 158C of ADC control circuit 158, an input 156B connected to an input register 160, an input 156C connected to an input register 162, an input 156D connected to an input register 164, an output 156E connected to an output register 166, an output 156F connected to an output register 168, and an output register 156G connected to an output register 170.

Figure 4:
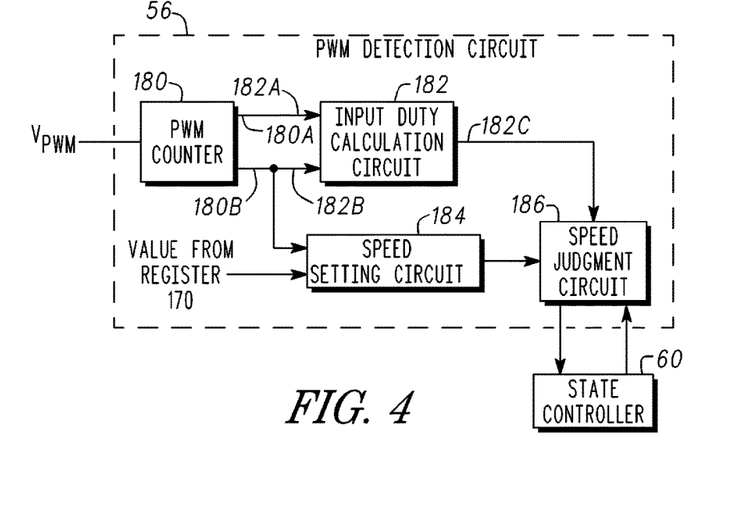
FIG. 4 is a circuit schematic of a portion of the drive circuit of FIG. 1 in accordance with another embodiment of the present invention.

FIG. 4 illustrates additional features of PWM detection circuit 56, and duty control controller 62 are shown. PWM detection circuit 56 includes a PWM counter 180 connected to an input duty calculation circuit 182, wherein input duty calculation circuit 182 has inputs 182A and 182B connected to outputs 180A and 180B of PWM counter 180, respectively. Duty control controller 62 is comprised of a speed setting circuit 184 connected to a speed judgment circuit 186, wherein speed setting circuit 184 may be configured to set the lowest-speed of rotor 18 and speed judgment circuit 186 may be configured to determine the lowest speed of rotor 18. Speed setting circuit 184 has an input commonly connected to output 180B of PWM counter 180 and to input 182B of input duty calculation circuit 182. Speed setting circuit 184 further includes an input coupled for receiving a lowest-speed set point $V_{LSP}$ from register 170. Speed judgment circuit 186 has an input connected to the output of speed setting circuit 184, an input connected to output 182C of input duty calculation circuit 182, an input connected to state controller 60 and an output connected to state controller 60.

Figure 5:
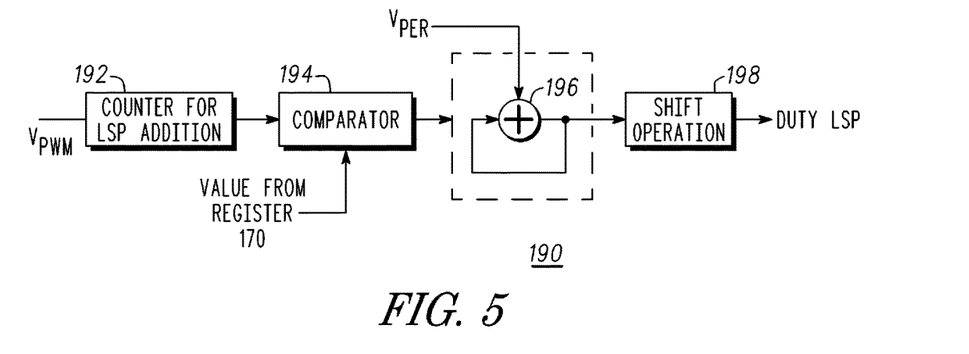
FIG. 5 is a circuit schematic of a portion of the drive circuit of FIG. 1 in accordance with another embodiment of the present invention.

FIG. 5 is a block diagram 190 of a portion of duty control controller 62 in FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first magnetization pole and a portion 22 magnetized with a second magnetization pole. By way of example, portion 20 is a north pole and portion 22 is a south pole. A U-phase winding 24 is coupled to or mounted on a portion of stator 16, a W-phase winding 26 is coupled to or mounted on another portion of stator 16, and a V-phase winding 28 is coupled to or mounted on yet another portion of stator 16. Drive circuit 12 is coupled to Hall sensor 14 via an electrical interconnect 29, to U-phase winding 24 via an electrical interconnect 30, to W-phase winding 26 via an electrical interconnect 32, and to V-phase winding 28 through an electrical interconnect 34. Electrical interconnects 30, 32, and 34 may be wires, electrically conductive traces, or the like.

Figure 6:
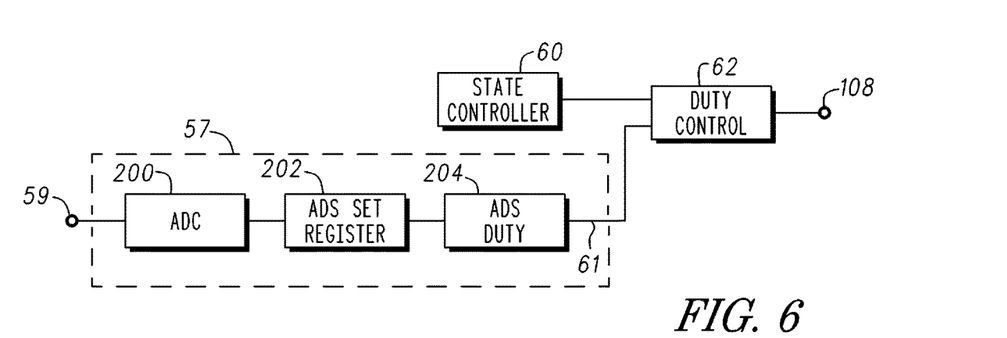
FIG. 6 is a circuit schematic of a portion of the drive circuit of FIG. 1 in accordance with another embodiment of the present invention.

FIG. 6 is a block diagram of ADS circuit 57 in accordance with an embodiment of the present invention. ADS circuit 57 includes an Analog-to Digital Circuit (ADC) 200, an ADS Set register 202, an ADS duty circuit 204, a state controller 60, and a duty control circuit 62. More particularly, ADC 200 has an input terminal and an output terminal, wherein the input terminal serves as dedicated external ADS input pin 59. ADS register 202 has an input terminal and an output terminal, where the input terminal of ADS register 202 is connected to the output terminal of ADC 200. ADS duty circuit 204 has an input terminal connected to an output terminal of ADS set register 202 and an output terminal 61 connected to a first input terminal of a duty control circuit 62. State controller 60 has an output terminal connected to a second input terminal of duty control controller 62. Duty controller 62 has an output that serves as output 108 of ADS circuit 57. A signal $V_{ADS}$ received at dedicated external ADS input pin 59 is converted to a digital signal and transmitted to a storage register 202. The ADS duty is determined by ADS duty circuit 204 in response to the signals stored in register 202.

Figure 7:
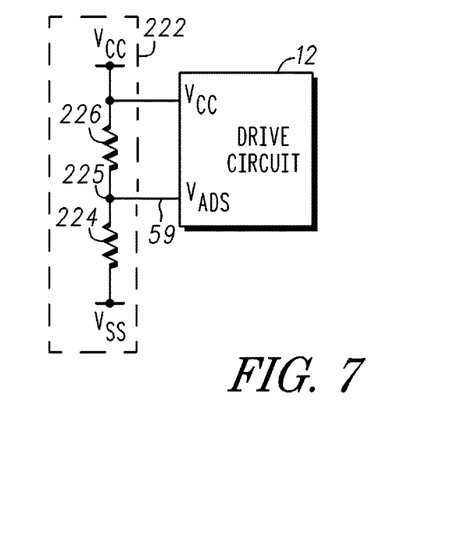
FIG. 7 is a circuit schematic of a portion of the drive circuit of FIG. 1 in accordance with another embodiment of the present invention.

Briefly referring to FIG. 7 and in accordance with an embodiment of the present invention, a voltage divider network 222 is connected to dedicated external ADS input pin 59. By way of example, voltage divider network 222 is comprised of a resistor 224 and a resistor 226, where resistor 224 has a terminal connected to dedicated external ADS input pin 59 and a terminal coupled for receiving a source of operating potential $V_{SS}$ and resistor 226 has a terminal connected to dedicated external ADS input pin 59 and a terminal coupled for receiving a source of operating potential $V_{CC}$. The terminals of resistors 224 and 226 that are connected together form a node 225. Source of operating potential $V_{SS}$ may be a ground potential.

Figure 8:
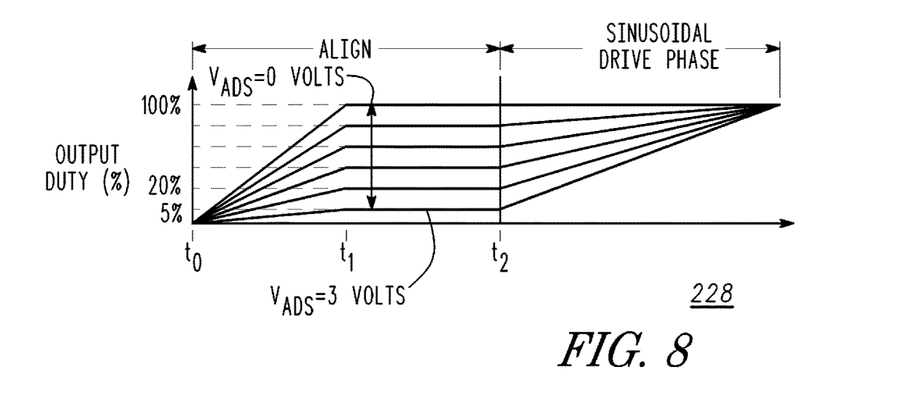
FIG. 8 is a plot showing a duty ratio versus time for a range of $V_{DS}$ voltages in accordance with an embodiment of the present invention.

Briefly referring to FIG. 8, a plot 228 is included showing a relationship between a supply voltage $V_{CC}$ and a duty setting voltage $V_{ADS}$ in response to a voltage across voltage divider network 222. More particularly, plot 228 is a plot of the duty ratio versus time in response to a supply voltage $V_{CC}$ ranging from 0 volts to 20 volts and the duty setting voltage $V_{DS}$ ranging from 0 volts to 3 volts. From time $t_0$ to time $t_1$, the output duty stabilizes at a voltage level in accordance with the duty setting voltage $V_{ADS}$ appearing at node 225, i.e., the duty ratio becomes substantially constant at a level set by duty setting voltage $V_{ADS}$. From time $t_0$ to time $t_2$, rotor 18 is aligned to Hall sensor 14 (shown in FIG. 1) and thus is referred to as an alignment phase. By time $t_2$, rotor 18 has been aligned with Hall sensor 14 and rotor 18 rotates and thus is referred to as an alignment phase.

Figure 9:
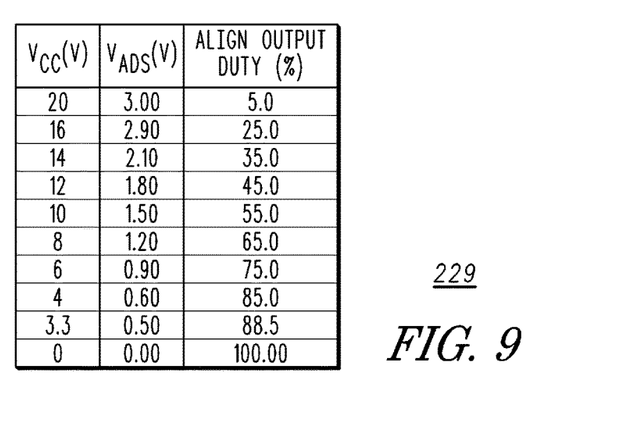
FIG. 9 is a chart showing the duty cycles of the drive circuit of FIG. 2 for sets of supply voltages and duty set voltages.

FIG. 9 is a chart 229 illustrating the align duty ratio as a percentage for plot 228, i.e., chart 229 shows the output duty in response to the supply voltage $V_{CC}$ ranging from 0 volts to 20 volts and align duty set voltage $V_{DS}$ ranging from 0 volts to 3 volts.

Figure 10:
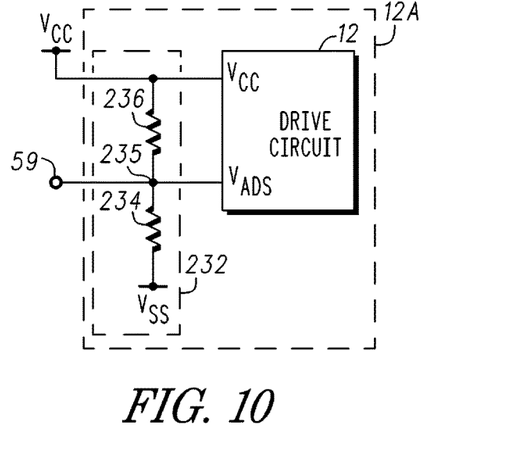
FIG. 10 is a circuit schematic of a portion of the drive circuit of FIG. 1 in accordance with another embodiment of the present invention.

For the sake of completeness, FIG. 10 is included to show that a voltage divider network 230 can be monolithically integrated with drive circuit 12 to form a drive circuit 12A.

By way of example, voltage divider network 232 is comprised of a resistor 234 and a resistor 236, where resistor 234 has a terminal connected to a dedicated external ADS input pin 59 and a terminal coupled for receiving a source of operating potential $V_{SS}$ and resistor 236 has a terminal connected to dedicated external ADS input pin 59 and a terminal coupled for receiving a source of operating potential $V_{CC}$. Source of operating potential $V_{SS}$ may be a ground potential. The terminals of resistors 234 and 236 that are connected together form a node 235.

Figure 11:
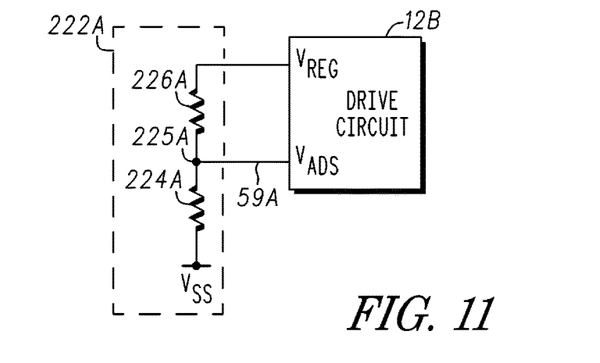
FIG. 11 is a circuit schematic of a portion of the drive circuit of FIG. 1 in accordance with another embodiment of the present invention.

FIG. 11 is circuit schematic of a drive circuit 12B connected to a voltage divider network 222A, wherein voltage divider network 222A is connected to an input 59A of drive circuit 12B. By way of example, voltage divider network 222A is comprised of a resistor 224A and a resistor 226A, where resistor 224A has a terminal connected to input 59A and a terminal coupled for receiving a source of operating potential $V_{SS}$ and resistor 226A has a terminal connected to input 59A and a terminal coupled configured to supply a regulated voltage $V_{REG}$. The terminals of resistors 224A and 226A that are connected together form a node 225A. Source of operating potential $V_{SS}$ may be a ground potential.

Figure 12:
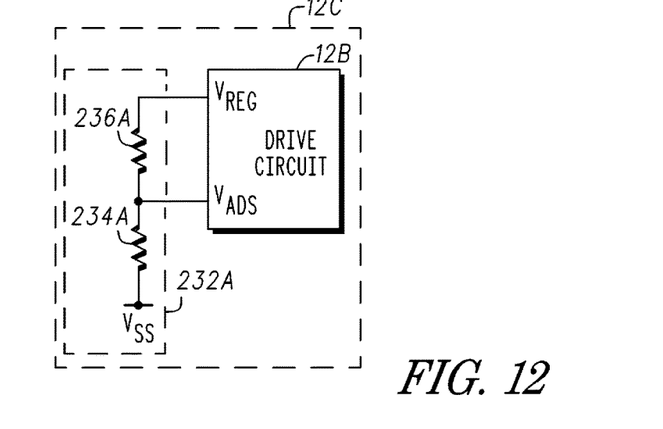
FIG. 12 is a circuit schematic of a portion of the drive circuit of FIG. 1 in accordance with another embodiment of the present invention.

FIG. 12 is included to show that a voltage divider network 230A can be monolithically integrated with drive circuit 12B to form a drive circuit 12C. By way of example, voltage divider network 232A is comprised of a resistor 234A and a resistor 236A, where resistor 234A has a terminal connected to input 59A and a terminal coupled for receiving a source of operating potential $V_{SS}$ and resistor 236A has a terminal connected to input 59A and a terminal coupled for receiving a regulated supply voltage $V_{REG}$. Source of operating potential $V_{SS}$ may be a ground potential. The terminals of resistors 234A and 236A that are connected together form a node 235A.

Figure 13:
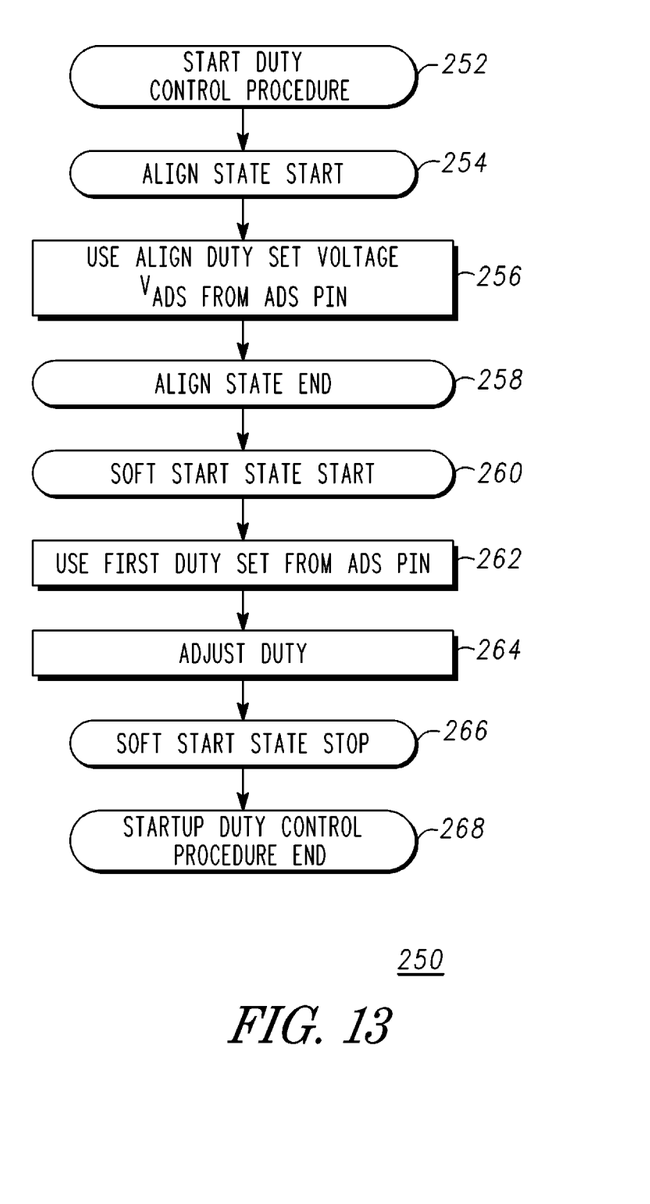
FIG. 13 is a flow diagram illustrating a method for setting a duty ratio of a signal using a voltage on dedicated external input pin in accordance with an embodiment of the present invention.

FIG. 13 is a flow diagram 250 illustrating a method for setting a duty ratio of a signal using dedicated external ADS input pin 59. The method begins at oval 252 which oval 252 indicates the start of the startup duty control procedure. At an early step, determination of the alignment state begins as indicated by oval 254. An alignment duty set signal $V_{ADS}$ is received at external ADS input pin 59 (box 256). It should be noted that the alignment duty set signal $V_{ADS}$ may be generated at node 225 of voltage divider network 222 or node 235 of voltage divider network 232. For example, rotor 18 is aligned to Hall sensor 14 in response to align duty set signal $V_{ADS}$ appearing at, for example, node 235. Briefly referring to FIG. 8, the alignment phase during which rotor 18 is aligned to Hall sensor 14 occurs from time $t_0$ to time $t_2$. It should be noted that time $t_2$ may be a time selected to ensure that alignment has been achieved. After achieving alignment, the alignment phase is completed as indicated by box 258.

After alignment, the start procedure begins as indicated by oval 260. In a beginning step (indicated by box 262), the duty of the drive signal is set in accordance with the alignment duty set signal $V_{ADS}$ appearing at, for example, node 225. After rotor 18 begins turning, the duty of the drive signal is adjusted (indicated by box 264). In response to rotor 18 being started, drive circuit 12 terminates the soft start phase (indicated by oval 266) and the start up duty control procedure is terminated (indicated by oval 268).

Figure 14:
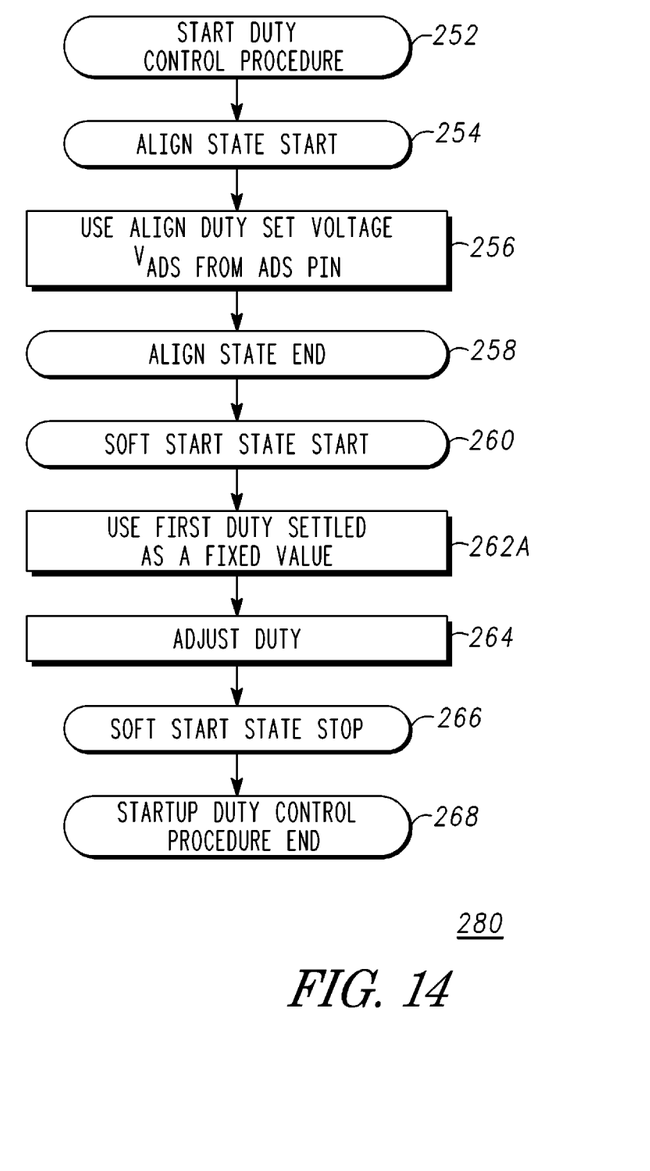
FIG. 14 is a flow diagram illustrating a method for setting a duty ratio of a signal using a regulation voltage in accordance with another embodiment of the present invention.

FIG. 14 s a flow diagram 280 illustrating a method for setting a duty ratio of a signal in accordance with another embodiment of the present invention. Flow diagram 280 is similar to flow diagram 250, except that box 262 is replaced by box 262A. In accordance with the embodiment of FIG. 14, in the beginning step (indicated by box 262A), the duty of the drive signal is set in accordance with a pre-set duty generated in response to an internal regulation signal $V_{REG}$ using, for example, drive circuit 12B or drive circuit 12C of FIG. 11 or FIG. 12, respectively.

Figure 15:
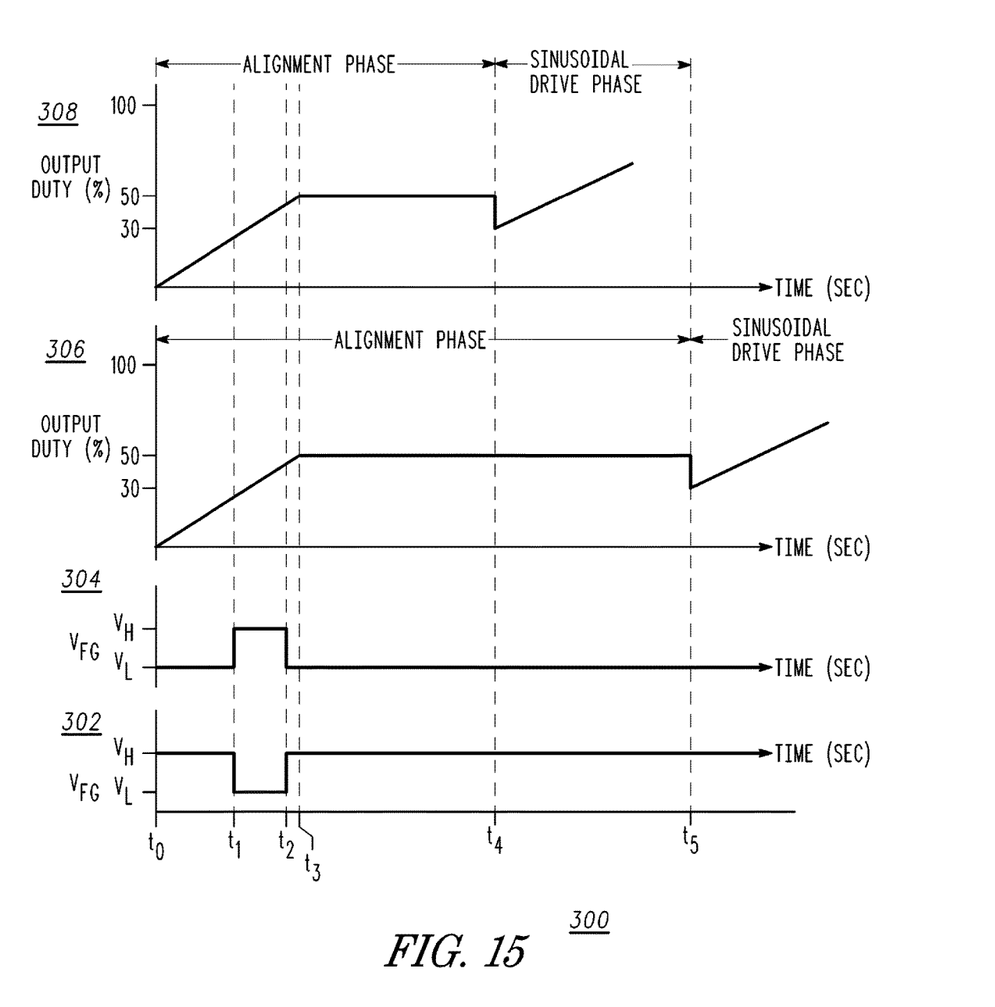
FIG. 15 is a plot of output duty versus time for a drive circuit in accordance with another embodiment of the present invention.

FIG. 15 is a plot 300 of output duty versus time in response to rotor 18 beginning to rotate, wherein plot 300 includes traces 308 and 306 showing output duty versus time and a traces 304 and 302 illustrating the output voltage $V_{FG}$ versus time. Trace 308 illustrates the output duty versus time in the absence of an anomaly appearing on FG voltage signal $V_{FG}$. From time $t_0$ to time $t_3$, the drive circuit such as, for example, drive circuit 12, generates a drive signal whose duty increases from 0% to about 50%. At time $t_3$, the duty stabilizes at 50%. It should be noted that the value of the duty at which the duty stabilizes is not a limitation. For example, the drive signal may have a duty that increases to 20%, 23%, 40%, or 60%, etc. In this example, from time $t_0$ to time $t_4$ the duty remains at about 50% and rotor 18 is aligned to Hall sensor 14. Thus, the time period from time $t_0$ to time $t_4$ is referred to as an alignment phase. At time $t_4$ alignment is complete and the duty of the drive signal from drive circuit 12 is decreased to, for example, 30%. From time $t_4$ a sinusoidal drive signal is generated having a duty that gradually increases. Decreasing the duty at time $t_4$ followed by gradually increasing the duty improves the sinusoidal characteristic of the drive signal. The time period from time $t_2$ is referred to as an alignment phase.

Still referring to FIG. 15, trace 306 illustrates the output duty versus time in the presence of an anomaly appearing on FG voltage signal $V_{FG}$. From time $t_0$ to time $t_3$, the drive circuit such as, for example, drive circuit 12, generates a drive signal whose duty increases from 0% to about 50%. At time $t_1$, an anomaly occurs on FG voltage signal $V_{FG}$. The anomaly may be voltage $V_{FG}$ increasing from voltage level $V_L$ to voltage level $V_H$ at time $t_1$ and decreasing from voltage level $V_H$ to voltage level $V_L$ at time $t_2$ as illustrated by plot 304 or it may be voltage $V_{FG}$ decreasing from voltage level $V_H$ to voltage level $V_L$ at time $t_1$ and increasing from voltage level $V_L$ to voltage level $V_H$ at time $t_2$ as illustrated by plot 302. At time $t_3$, the duty stabilizes at 50%. It should be noted that the value of the duty at which the duty stabilizes is not a limitation. For example, the drive signal may have a duty that increases to 20%, 23%, 40%, or 60%, etc. In this example, from time $t_3$ to time $t_5$ the duty remains at about 50% and rotor 18 is aligned to Hall sensor 14. Thus, the time period from time $t_0$ to time $t_5$ is referred to as an alignment phase. At time $t_5$ alignment is complete and the duty of the drive signal from drive circuit 12 is decreased to, for example, 30%. From time $t_5$ a sinusoidal drive signal is generated having a duty that gradually increases. Decreasing the duty at time $t_5$ followed by gradually increasing the duty improves the sinusoidal characteristic of the drive signal. The time period from time $t_2$ is referred to as an alignment phase. It should be noted that time $t_5$ in trace 304 may be set as the sum of time $t_2$ and time $t_3$, i.e., $t_5=t_2+t_3$. Alternatively, time $t_5$ may be selected as another value.

Figure 16:
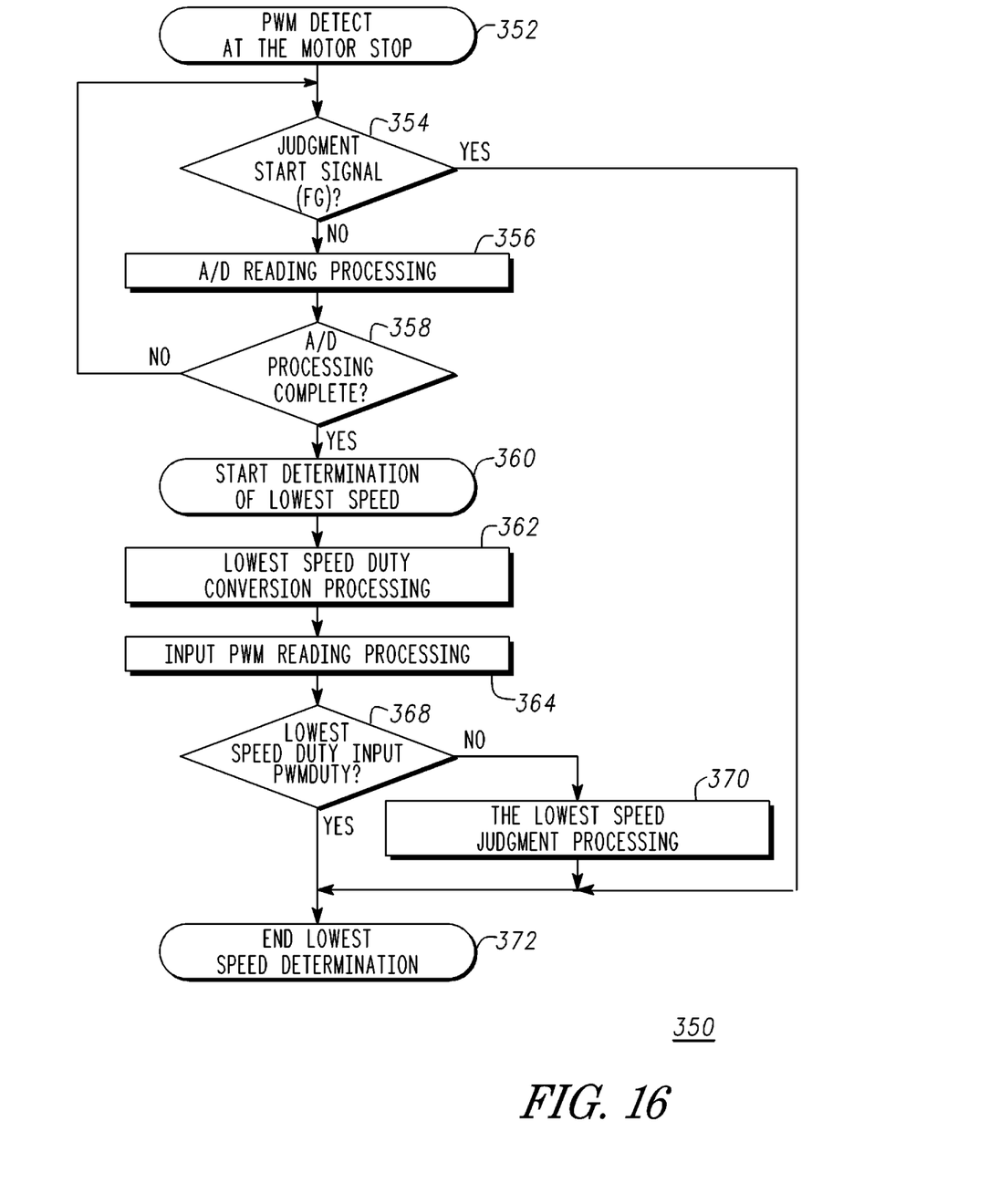
FIG. 16 is a flow diagram illustrating a method for determining a duty ratio of a control signal.

FIG. 16 is a plot 320 of output duty versus time in response to rotor 18 beginning to rotate. From time $t_0$ to time $t_2$, the drive circuit such as, for example, drive circuit 12, generates a drive signal whose duty increases from 0 to about 50%. It should be noted that the value of the duty is not a limitation. For example, the drive signal may have a duty that increases to 20%, or 30%, or 40%, or 60%, etc. From time $t_1$ to time $t_2$, the duty remains at about 50% and rotor 18 is aligned to Hall sensor 14. At time t1, the voltage at terminal 138 of comparator 136, i.e., the FG signal, changes from a logic low voltage level to a logic high voltage level. To ensure that anomalies such as the change in the FG signal at time $t_1$ do not interfere with the alignment of rotor 18 to Hall sensor 14, the alignment period is extended. In this example, the alignment period would have ended at time $t_3$, as indicated by the broken line plot 322. However, the alignment period is extended to time $t_4$. Thus, the alignment phase occurs from time $t_0$ to time $t_4$. At time $t_4$ alignment is complete and the duty of the drive signal from drive circuit 12 is decreased to, for example, 30%. From time $t_4$ a sine wave drive signal is applied having a duty that gradually increases. Decreasing the duty at time t4 followed by gradually increasing the duty improves the sinusoidal characteristic of the drive signal. The drive phase starts at time $t_4$.

For the sake of completeness, FIG. 17 is a flow diagram 350 illustrating a method for setting a duty of a signal using an external pin. In operation PWM detection circuit 56 detects a PWM input signal at stoppage of three-phase motor 10, i.e., stoppage of rotor 18, as indicated by box 352 of flow diagram 350 and determines whether a start signal has been received. At decision diamond 354, if a start signal has been received (YES branch of decision diamond 354) detection circuit 56 determines the lowest speed of motor 10 as indicated by box 360. If the start signal has not been received, ADC 154 of duty determination circuit 150 begins reading the analog signal from three-phase motor 10 (indicated by box 356) and continues reading the analog signal if the analog to digital processing is not complete (indicated by the NO branch of decision diamond 358) If the analog to digital processing is complete (indicated by the YES branch of decision diamond 358), PWM detection circuit 56 begins determining the lowest speed (indicated by box 350). Briefly referring to FIG. 3, selector 152 is configured so that advance angle pins Pin_1, Pin_2, and lowest speed PWM setting pin, Pin_LS are read in response to selector 152 activating inputs 152A, 152B, and 152C, respectively. It should be noted that ADC control circuit 158 generates an enable signal at input 154B, wherein the enable signal changes from a first state to a second state such as, for example changing from a low logic state to a high logic state in response to the PWM signal changing from the first state to the second state causing ADC 154 to begin converting the analog signals received from pins Pin_1, Pin_2, and Pin-_LSIn to digital signals. After completing the reading of the analog signals, determination of the lowest speed is started as indicated by box 360. After completing the reading of the analog signal by ADC 154, the value read from the external setting pin is converted to the lowest speed duty value as indicated by box 362. Box 314 indicates completion of reading the PWM duty. Then the lowest speed duty value and the input PWM duty value are compared as indicated by decision diamond 366. If the lowest speed duty is greater than the input PWM duty, the lowest speed determination process is completed as indicted by box 370. If the lowest speed duty is less than the input PWM duty, the lowest speed determination process continues as indicated by box 368. The process continues until the lowest speed duty is greater than the input PWM duty at which point the lowest speed determination process is complete as indicated by box 370.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for driving a motor, comprising:
providing an align duty set circuit having an input and an output, the align duty set circuit comprising:
an analog-to-digital converter circuit having an input and an output;
an align duty set register having an input and an output, the input of the align duty set register coupled to the output of the analog-to-digital converter;
an align duty set duty circuit having an input and an output, the input of the align duty set duty circuit coupled to the output of the align duty set register;
a duty control circuit having first and second inputs and an output, the first input coupled to the output of the align duty set duty circuit and the second input coupled to a state controller;
determining a position of a first pole of a rotor of the motor relative to a position of a Hall sensor;
receiving a first duty control signal or a second duty control signal in response to the position of the first pole of the rotor of the motor relative to the position of the Hall sensor, wherein the second duty control signal is an align duty set signal; and
generating a drive signal having a duty in accordance with the first duty control signal or the align duty set signal, and wherein generating the drive signal includes:
magnetizing the U-phase winding and the W-phase winding with a first magnetic polarity and the V-phase winding with a second magnetic polarity; and
wherein the first pole of the rotor is of the first magnetic polarity.

2. The method of claim 1, wherein generating the drive signal having the duty in accordance with the first duty control signal or the align duty set signal.

3. The method of claim 1, wherein generating the drive signal having the duty in accordance with the first duty control signal or the align duty set signal includes using a voltage divider network to generate the align duty set signal.

4. The method of claim 3, wherein the using the voltage divider network to generate the align duty set signal includes using a voltage divider network that is external to a drive circuit configured to generate drive signals.

5. The method of claim 3, wherein the using the voltage divider network to generate the align duty set signal includes using a voltage divider network that is internal to a drive circuit configured to generate drive signals.

6. The method of claim 1, further including generating a comparison signal in response to comparing a first signal from the Hall sensor with a second signal from the Hall sensor.

7. The method of claim 6, further including generating the drive signal in response to the comparison signal and a control signal generated in response to an input signal from a voltage divider network.

8. A method for driving a motor comprising a rotor having a first pole of a first magnetic polarity and a second pole of a second magnetic polarity, a stator, a first coil coupled at a first position of the stator and associated with a first drive phase, a second coil coupled at a second position of the stator and associated with a second drive phase, and a third coil coupled at a third position of the stator and associated with a third drive phase of a drive signal, wherein a Hall sensor is coupled to a fourth portion of the stator, the fourth portion between the first coil and the second coil and a drive circuit is coupled to the motor, comprising:
providing the drive circuit having an input pin dedicated for receiving an align duty set signal;
determining a position of the first pole of the rotor in response to a signal from the single Hall sensor;
determining an align duty set ratio in response to the align duty set signal; and
starting the motor using a signal having one of the duty ratio of the align duty set signal or a predetermined duty ratio.

9. The method of claim 8, further including coupling a voltage divider network to the input pin dedicated for receiving the align duty set signal.

10. The method of claim 9, wherein the voltage divider network comprises:
a first resistor having a first terminal and a second terminal, the first terminal of the first resistor coupled to the output pin dedicated for receiving the align duty set signal and the second terminal of the first resistor coupled for receiving a first source of operating potential; and
a second resistor having a first terminal and a second terminal, the first terminal of the second resistor coupled to the to the output pin dedicated for receiving the align duty set signal and the second terminal of the second resistor coupled for receiving a second source of operating potential.

11. The method of claim 9, wherein the input pin dedicated for receiving the align duty set signal is left floating.

12. The method of claim 8, further including monolithically integrating a voltage divider network in the drive circuit.

13. The method of claim 8, wherein starting the motor includes increasing the duty of the drive signal to a predetermined level and decreasing the duty of the drive signal after reaching the predetermined level.

14. The method of claim 8, wherein starting the motor using a signal having one of the duty ratio of the align duty set signal or a predetermined duty ratio includes starting the motor using the duty ratio of the align duty set signal.

15. A drive circuit for a motor having a plurality of coils and a single Hall sensor having a first terminal and a second terminal, comprising:
a rotational state generation circuit having a first input terminal, a second input, terminal and an input/output terminal;
a state controller having a first input terminal, a second input terminal, a third input terminal, a first input/output terminal, a second input/output terminal, and an output terminal;
a pulse width modulation detection circuit having an input terminal and an output terminal, the output terminal coupled to the first input terminal of the state controller;
a duty control controller having a first input terminal, a second input terminal, a first input/output terminal, and an output terminal, the first input terminal of the duty control controller coupled to the output terminal of the pulse width modulation detection circuit and the first input/output terminal coupled to the second/input output terminal of the state controller; and
an align duty set circuit having an input terminal and an output terminal, the output terminal of the align duty set circuit coupled to the second input terminal of the duty control controller and the input terminal of the align duty set circuit serving as a dedicated input pin of the drive circuit.

16. The drive circuit of claim 15, wherein the align duty set circuit comprises:

an analog-to-digital converter, having an input terminal and an output terminal, the input terminal of the analog-to-digital circuit serving as the input terminal of the align duty set circuit;

an align duty set register having an input terminal and an output terminal, the input terminal of the duty set register coupled to the output terminal of the analog-to-digital converter; and a duty generator configured to generate an align duty set control signal, the duty generator having an input terminal and an output terminal, the input terminal of the duty generator coupled to the output terminal of the align duty set register and the output terminal of the duty generator serving as the output terminal of the align duty set circuit.

17. The drive circuit of claim 16, further including a voltage divider circuit coupled to the dedicated input pin of the drive circuit.

18. The drive circuit of claim 17, wherein the voltage divider circuit comprises:

a first resistor having a first terminal and a second terminal, the first terminal of the first resistor coupled to the to the dedicated input pin of the drive circuit and the second terminal of the first resistor coupled for receiving a first source of operating potential; and a second resistor having a first terminal and a second terminal, the first terminal of the second resistor coupled to the dedicated input pin of the drive circuit and the second terminal of the second resistor coupled for receiving a second source of operating potential.

19. The drive circuit of claim 17, wherein the voltage divider circuit is monolithically integrated with the align duty set circuit.

* * * * *